(12) United States Patent
Angles et al.

(10) Patent No.: US 11,816,798 B1
(45) Date of Patent: Nov. 14, 2023

(54) 3D SURFACE REPRESENTATION REFINEMENT

(71) Applicant: Apple Inc., Cupertino, CA (US)

(72) Inventors: Baptiste Angles, Sunnyvale, CA (US); Yu Ping Lin, San Jose, CA (US); Ming Chuang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/195,817

(22) Filed: Mar. 9, 2021

Related U.S. Application Data (60) Provisional application No. 62/990,504, filed on Mar. 17, 2020.

(51) Int. Cl.
| | | |
|---|---|---|
| *G06T 17/20* | (2006.01) | |
| *G06T 19/20* | (2011.01) | |
| *G06T 17/10* | (2006.01) | |

(52) U.S. Cl.
CPC ............ *G06T 17/205* (2013.01); *G06T 17/10* (2013.01); *G06T 19/20* (2013.01); *G06T 2219/2004* (2013.01)

(58) Field of Classification Search
CPC ....... G06T 17/10; G06T 17/205; G06T 19/20; G06T 2219/2004
See application file for complete search history.

(56) References Cited

U.S. PATENT DOCUMENTS

| | | | |
|---|---|---|---|
| 8,675,951 B2 | 3/2014 | van den Hengel et al. | |
| 9,208,609 B2 | 12/2015 | Taguchi et al. | |
| 9,928,654 B2 | 3/2018 | Miller | |
| 10,937,236 B1* | 3/2021 | St-Pierre | G06T 17/20 |
| 2009/0027412 A1* | 1/2009 | Burley | G06T 15/04 345/582 |
| 2012/0259743 A1* | 10/2012 | Pate, Jr. | G06Q 30/00 705/27.2 |
| 2015/0084953 A1* | 3/2015 | Luo | G06T 17/00 345/420 |
| 2016/0005221 A1* | 1/2016 | Mörwald | G06T 5/005 348/222.1 |
| 2017/0236268 A1* | 8/2017 | Watanabe | G06T 7/70 382/152 |

(Continued)

OTHER PUBLICATIONS

Wang, Jun, et al. "A framework for 3D model reconstruction in reverse engineering." Computers & Industrial Engineering 63.4 (2012): 1189-1200. (Year: 2012).*

(Continued)

*Primary Examiner* — Daniel F Hajnik
(74) *Attorney, Agent, or Firm* — Thompson Hine LLP

(57) ABSTRACT

Various implementations disclosed herein include devices, systems, and methods that refine a first 3D surface representation (e.g., a 3D point cloud or a 3D mesh) using a second 3D surface representation that includes a 3D geometric primitive. In some implementations, a first 3D surface representation of a physical environment is obtained including points at 3D locations determined based on data generated by a first sensor. In some implementations, a second 3D surface representation corresponding to at least a portion of the physical environment is obtained that includes at least one 3D geometric primitive. In some implementations, a determination whether to adjust the 3D locations of at least one point of the points of the first 3D surface representation is made based on the 3D geometric primitive, and the 3D locations of the at least one point is adjusted to align with the geometric primitive based on the determination.

20 Claims, 8 Drawing Sheets

(56) References Cited

U.S. PATENT DOCUMENTS

| | | | | |
|---|---|---|---|---|
| 2017/0365102 | A1* | 12/2017 | Huston | G06T 17/00 |
| 2019/0018680 | A1* | 1/2019 | Charamisinau | G06T 17/00 |
| 2019/0197775 | A1* | 6/2019 | Sanchez Bermudez | |
| | | | | G06F 30/00 |
| 2020/0080849 | A1* | 3/2020 | Ondruska | G01C 21/12 |
| 2020/0098178 | A1* | 3/2020 | Ni | G06V 40/168 |
| 2021/0142547 | A1* | 5/2021 | Fessler, Jr. | A63F 13/847 |
| 2021/0272366 | A1* | 9/2021 | Eckert | G06T 19/006 |

OTHER PUBLICATIONS

Rusu, Radu Bogdan, et al. "Towards 3D point cloud based object maps for household environments." Robotics and Autonomous Systems 56.11 (2008): 927-941. (Year: 2008).*

Taguchi, Yuichi, et al. "Point-plane SLAM for hand-held 3D sensors." 2013 IEEE international conference on robotics and automation. IEEE, 2013. (Year: 2013).*

Li, Wei, Xiao Xiao, and James Hahn. "3d reconstruction and texture optimization using a sparse set of rgb-d cameras." 2019 IEEE Winter Conference on Applications of Computer Vision (WACV). IEEE, 2019. (Year: 2019).*

Hedman, Peter, et al. "Scalable inside-out image-based rendering." ACM Transactions on Graphics (TOG) 35.6 (2016): 1-11. (Year: 2016).*

Poullis, Charalambos; Gardner, Andrew and Debevec, Paul; "Photogrammetric Modeling and Image-Based Rendering for Rapid Virtual Environment Creation"; University of Southern California, Institute for Creative Technologies; Marina Del Ray, CA; pp. 1-7; Mar. 31, 2004.

* cited by examiner

3D SURFACE REPRESENTATION REFINEMENT

CROSS-REFERENCE TO RELATED APPLICATIONS

This Application claims the benefit of U.S. Provisional Application Ser. No. 62/990,504 filed Mar. 17, 2020, which is incorporated herein in its entirety.

TECHNICAL FIELD

The present disclosure generally relates to electronic devices, and in particular, to systems, methods, and devices for implementing computer-based techniques that refine three-dimensional (3D) surface representations of physical environments.

BACKGROUND

Various computer-based techniques are used to identify the locations of planar regions based on one or more images of a physical environment. For example, simultaneous localization and mapping (SLAM) techniques can provide 3D point locations based on matching texture (or other features) in images of a physical environment and these 3D points can be used to predict the locations of floors, table surfaces, walls, ceilings, and other planar regions. However, because of the randomness of estimated planar regions in 3D point clouds generated by SLAM and other techniques, the planar regions are often inadequate. In addition, the planar regions generated by such techniques may be noisy or otherwise fail to adequately represent the smoothness, flatness, curvature, or other geometric characteristics of objects in the physical environment.

SUMMARY

Various implementations disclosed herein include devices, systems, and methods that refine a first 3D surface representation of a physical environment using a second 3D surface representation that includes a 3D geometric primitive. In some implementations, the first 3D surface representation of a physical environment is a 3D point cloud or a 3D mesh. In some implementations, the 3D geometric primitive is a plane, a cylinder, a cone, a sphere, a curve, or the like. In some implementations, 3D locations of points of the first 3D surface representation are adjusted based on the 3D geometric primitive. In some implementations, to provide a smoother or less noisy surface, points of the first 3D surface representation that satisfy criteria (e.g., distance, surface normal, neighborhood) are determined to correspond to a surface of the 3D geometric primitive and are adjusted (e.g., projected onto the surface of the geometric primitive).

Various implementations disclosed herein include devices, systems, and methods that refine a first 3D surface representation (e.g., a 3D point cloud or a 3D mesh) using a second 3D surface representation that includes a 3D geometric primitive. In some implementations, a first 3D surface representation of a physical environment is obtained, the first 3D surface representation having points at 3D locations determined based on data generated by a first sensor. In some implementations, a second 3D surface representation corresponding to at least a portion of the physical environment is obtained, wherein the second 3D surface representation includes a 3D geometric primitive. In some implementations, determining to adjust the 3D locations of at least one point of the points of the first 3D surface representation is made based on the 3D geometric primitive. In some implementations, the 3D locations of the at least one point are adjusted to align with the geometric primitive based on the determining.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
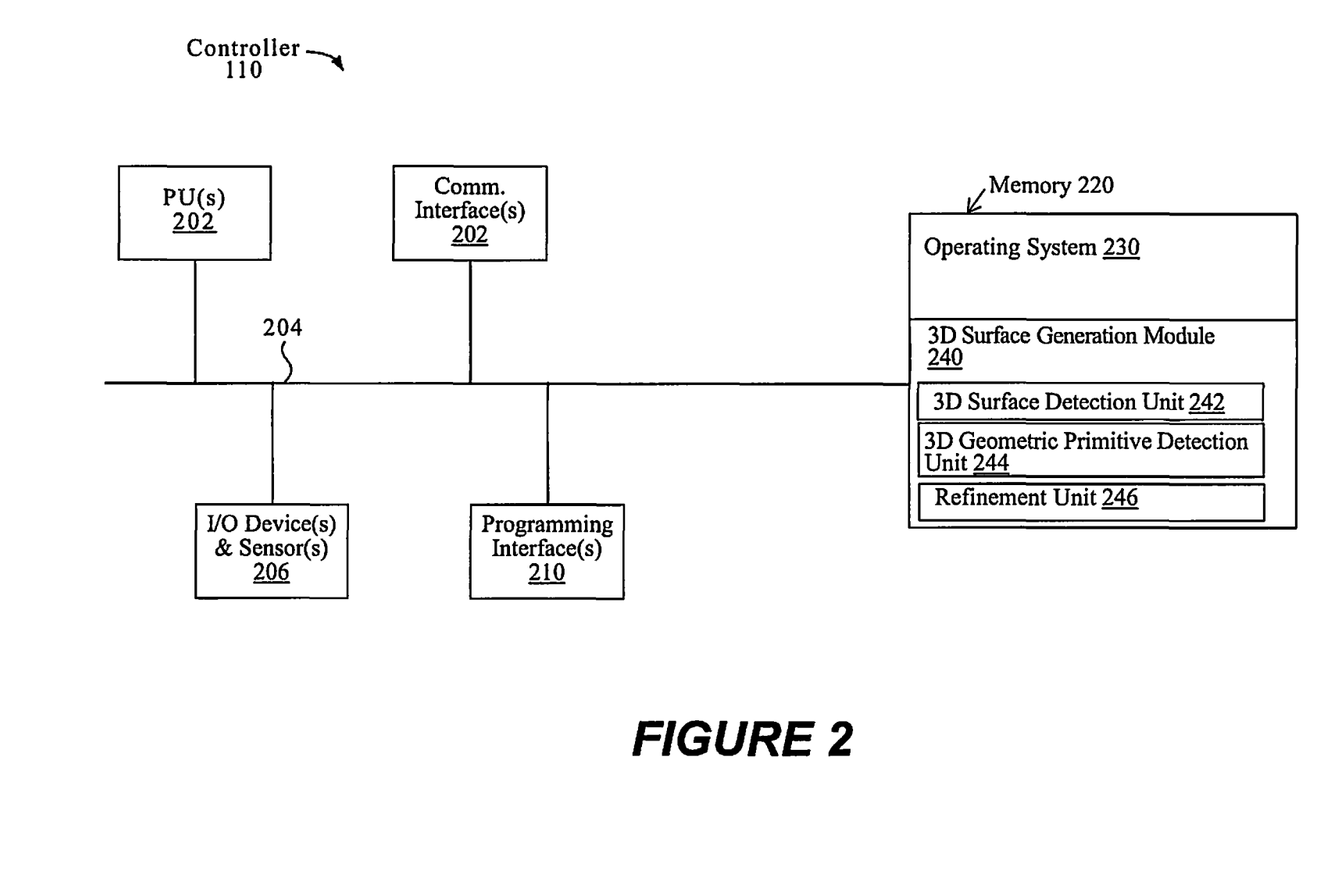
FIG. 2 is a block diagram of an example controller in accordance with some implementations.
Figure 3:
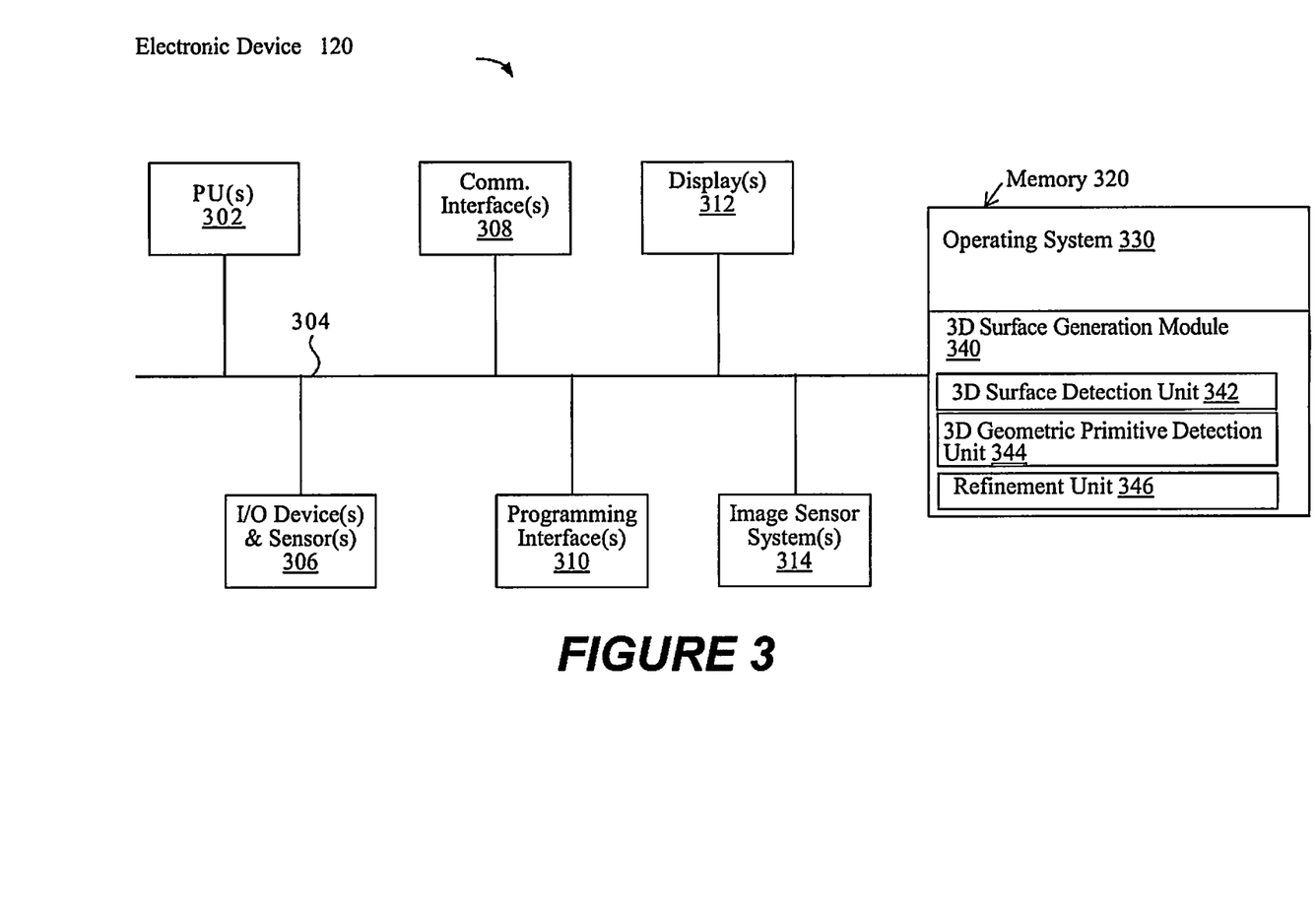
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held mobile electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

Figure 1:
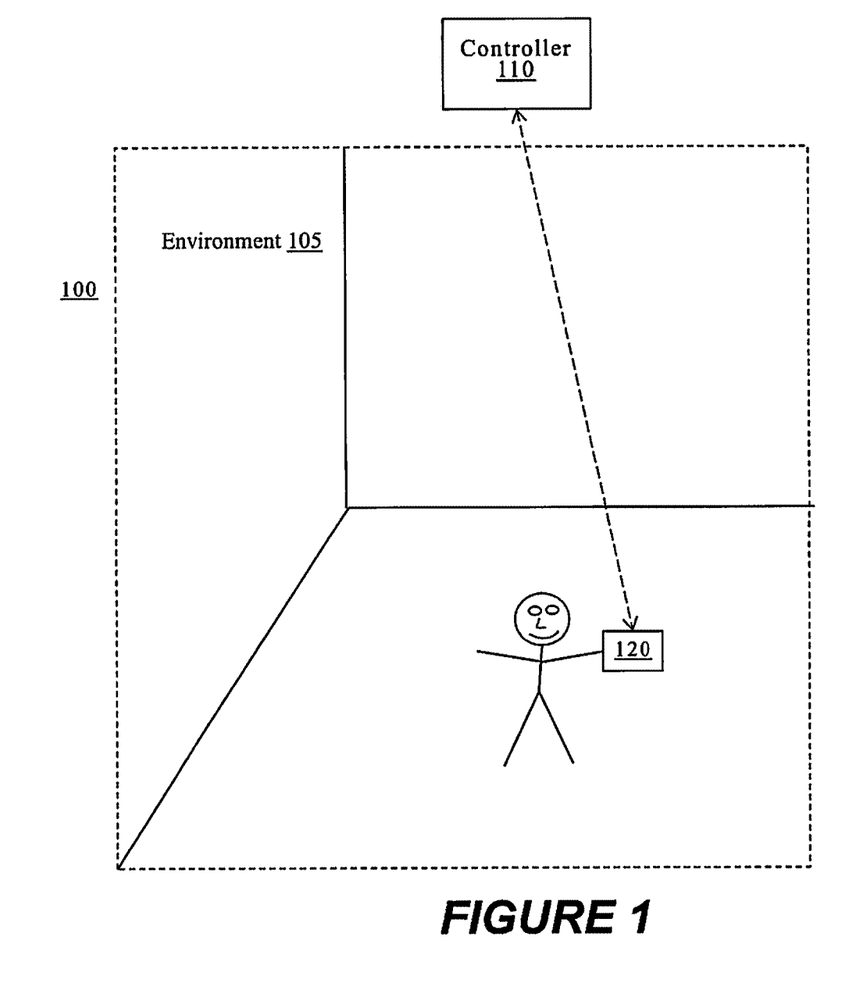
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a 3D surface generation module 240.

The operating system 230 includes procedures for handling various basic system services and for performing hardware dependent tasks.

In some implementations, the 3D surface generation module 240 is configured to generate, share, or manage 3D surface information. In some implementations, the 3D surface generation module 240 includes a 3D surface detection unit 242, a 3D geometric primitive detection unit 244, and a refinement unit 246. The 3D surface detection unit 242 is configured to generate a first 3D surface representation of a physical environment. The 3D geometric primitive detection unit 244 is configured to generate a second 3D surface representation of a portion of the physical environment including a 3D geometric primitive. The refinement unit 246 is configured to modify the first 3D surface representation using 3D geometric primitives in the second 3D surface representation.

The 3D surface generation module 240 may be used to create 3D surface representations that are used, for example, by an application that is configured to present virtual content (e.g., 3D content) for one or more users. For example, the user may view and otherwise experience a user interface that allows the user to select, place, move, and otherwise present an environment, for example, based on the virtual content location via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present content to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more interior or exterior facing sensor systems 314 include an image capture device or array that captures image data or an audio capture device or array (e.g., microphone) that captures audio data. In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light (e.g., upon a subject or a portion of the face of the user) such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a 3D surface generation module 340.

The operating system 330 includes procedures for handling various basic system services and for performing hardware dependent tasks.

In some implementations, the 3D surface generation module 340 is configured to generate, share, or manage 3D surface information. In some implementations, the 3D surface generation module 340 includes a 3D surface detection unit 342, a 3D geometric primitive detection unit 344, and a refinement unit 346. The 3D surface detection unit 342 is configured to generate a first 3D surface representation of a physical environment. The 3D geometric primitive detection unit 344 is configured to generate a second 3D surface representation of a portion of the physical environment including a 3D geometric primitive. The refinement unit 346 is configured to modify the first 3D surface representation using 3D geometric primitives in the second 3D surface representation.

The 3D surface generation module 340 may be used to create 3D surface representations that are used, for example, by an application that is configured to present virtual content (e.g., 3D content) to one or more users. For example, the user may view and otherwise experience a user interface that allows the user to select, place, move, and otherwise present an environment, for example, based on the virtual content location via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that refine a first 3D surface representation of a physical environment using a second 3D surface representation of at least a portion of the physical environment that includes a 3D geometric primitive. In some implementations, the first 3D surface representation of the physical environment is a 3D point cloud or a 3D mesh. In some implementations, the first 3D surface representation is used in a scene reconstruction algorithm. In some implementations, the second 3D surface representation is used in a plane estimation algorithm. In some implementations, 3D locations of points of the first 3D surface representation are adjusted based on the 3D geometric primitive(s) (e.g., plane) in the second 3D surface representation. In some implementations, to provide a smoother or less noisy surface, points of the first 3D surface representation that satisfy criteria (e.g., distance, surface normal, neighborhood) are determined to correspond to a surface of the 3D geometric primitive and are adjusted (e.g., projected onto the surface of the geometric primitive). In some implementations, the 3D geometric primitive is a plane, a cylinder, a cone, a sphere, a curve, or the like.

In some implementations, the second 3D surface representation is generated using data from the same or an additional sensor (e.g., a corresponding image sensor, depth sensor, or the like) that was captured at the same or similar time to generate the first 3D surface representation.

Figure 4:
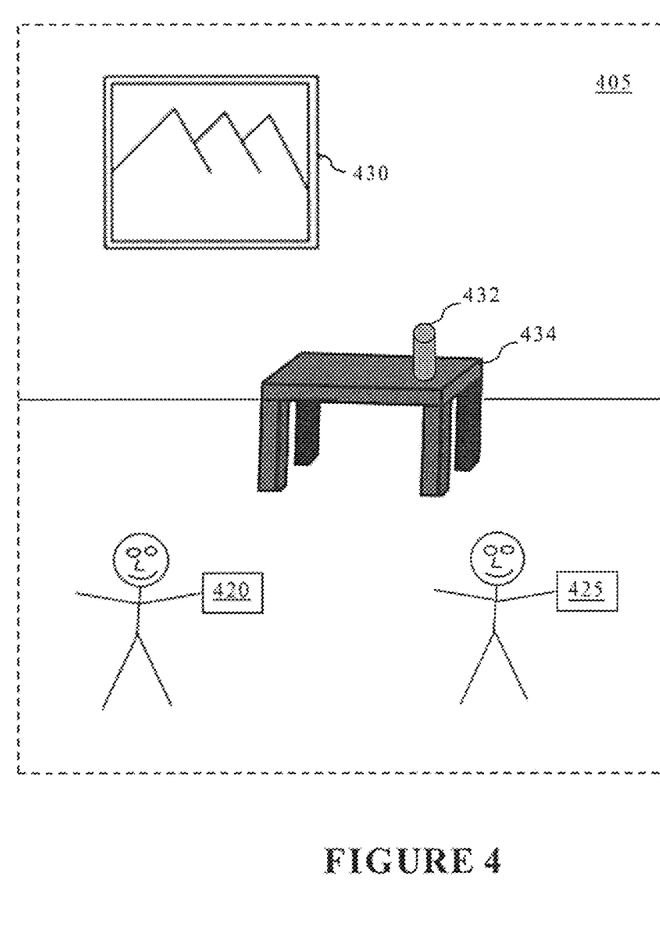
FIG. 4 is a block diagram showing an example environment.

Referring to FIG. 4, a physical environment 405 includes a first electronic device 420 being used by a first user and a second electronic device 425 being used by a second user. In this example, the environment 405 is a room that includes picture 430, a can 432, and a table 434. The two devices 420, 425 can operate alone or interact with additional devices not shown to capture images of the environment, detect or track objects in those images, or to present content based on the images and the detected/tracked objects. Each of the two devices 420, 425 may communicate wirelessly or via a wired connection with a separate controller (not shown) to perform one or more of these functions. Similarly, each of the two devices 420, 425 may store information or may communicate with a separate device such as a server or other computing device that stores this information.

The first device 420 and the second device 425 are each configured to use images or other real-world information detected based on a camera(s) or other sensor(s) to display content to the users.

Figure 5:
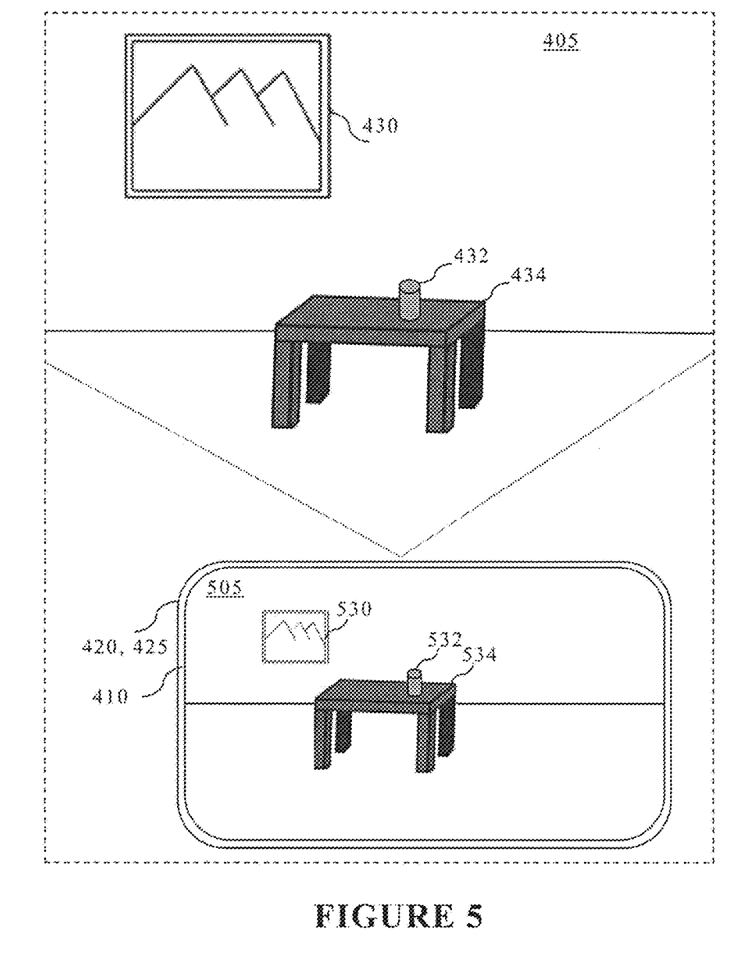
FIG. 5 is a block diagram showing a mobile device capturing a frame of a sequence of frames in the environment of FIG. 4 in accordance with some implementations.

FIG. 5 is a block diagram of the first or second device 420, 425 showing a view of the physical environment 405 of FIG. 4 in a display 410 in accordance with some implementations. As shown in FIG. 5, the first or second device 420, 425 captures at least images to generate the view 505 including a depiction 530 of the picture 430, a depiction 532 of the can 432, and a depiction 534 of the table 434.

In some implementations, the first or second device 420, 425 enable the user to change the viewpoint or otherwise modify or interact with the content. In some implementations, the first or second device 420, 425 are configured to receive user input that interacts with displayed content. For example, a virtual object such as a 3D representation of a real-world person or object, or informational displays each with interactive commands may be presented. A user may reposition the virtual object or informational displays relative to the depicted real objects or interact with the interactive commands by providing user input on or otherwise using the respective device. In some implementations, the first or second device 420, 425 is a device such as the controller 100 or the electronic device 120 of FIGS. 1-3, or a mobile electronic device.

In some implementations, there are two 3D surface representations for at least a portion of the physical environment. In some implementations, a first 3D surface representation is a 3D mesh generated from image and depth sensor data. In some implementations, a second 3D surface representation includes one or more 3D geometric primitives from image sensor data, sparse depth sensor data, dense depth sensor data, or some combination thereof. In some implementations, portions of the two 3D surface representations are harmonized one against the other.

Figure 6A:
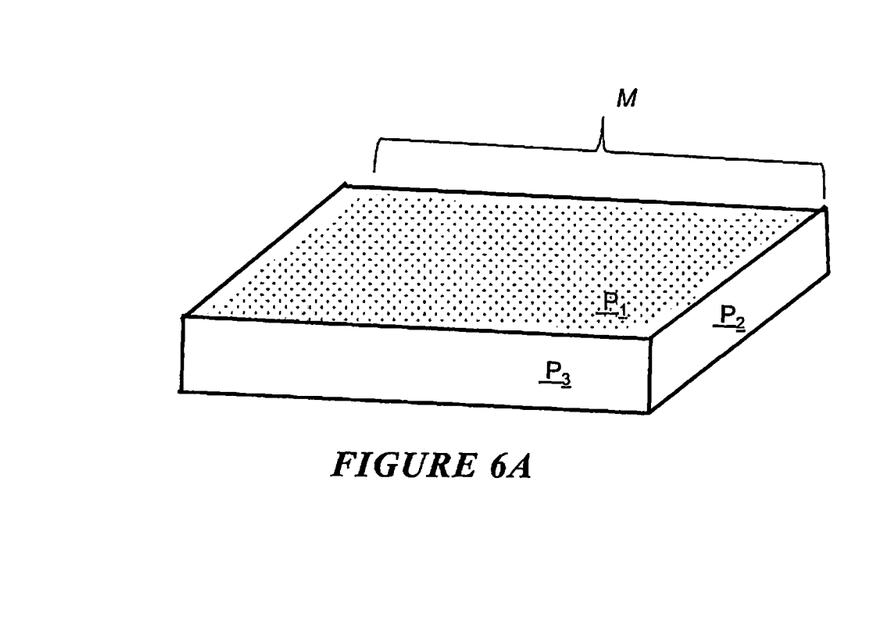
FIG. 6A is a diagram that shows a portion of a 3D reconstruction of a geometric primitive in accordance with some implementations.

FIG. 6A is a diagram illustrating a portion of 3D reconstructions of the table 434. As shown in FIG. 6A for example, there is a first 3D surface representation M of a portion of a top surface of the depiction of the table 534 having points at 3D locations determined based on data generated by a first sensor. In some implementations, the first 3D surface representation M may be continuously or repeatedly updated with additional data from the first sensor. In some implementations, the first 3D surface representation M is a 3D point cloud or a 3D mesh, and thus includes imperfections or noise. In some implementations, the first 3D surface representation M is a convex hull 3D mesh or a grid extent 3D mesh.

In some implementations, the first 3D surface representation M visually appears to be smooth (e.g., a flat table top) to a user, however, minor deviations exist in the first 3D surface representation M. In some implementations, the minor deviations in the first 3D surface representation M may be estimated by a noise variance in the 3D locations in the 3D mesh. In some implementations, the first 3D surface representation M visually appears to be smooth, but the first 3D surface representation M may be 1°-2° from being planar. In some implementations, the first 3D surface representation M visually appears to be smooth, but individual 3D locations may be 1-2 mm from an actual planar surface (e.g., of the table top).

In some implementations, difficulties may be caused by the minor deviations of the first 3D surface representation M during interactions (e.g., correctly representing physics). In a first example, a virtual object (e.g., a vase) may be placed on the first 3D surface representation M, however when the virtual object is dragged across the first 3D surface representation M (e.g., the top surface of the depiction of the table 534), the virtual object may wobble or be perceptually inconsistent relative to expected motion. Similarly, virtual objects (e.g., balls) that are rolled or dropped onto the first 3D surface representation M (e.g., the top surface of the depiction of the table 534), roll or bounce in an unnatural way.

In a second example, when rendering visual effects (e.g., lighting, moving light sources, directed light sources, relighting, shadows, etc.) on the first 3D surface representation M (e.g., the top surface of the depiction of the table 534), the underlying inaccurate representation of the plane results in rendering that are different from what the user visually expects. In addition, because the first 3D surface representation M is always being updated (e.g., the 3D point cloud or 3D mesh), there can be underlying continuous updates to vertices that causes modifications to the visual effects for the tabletop (e.g., changing shadows, jitter effects, etc.) that are perceptually noticeable and incorrect to the user. In a third example, because the first 3D surface representation M (e.g., the top surface of the depiction of the table 534), appears to be planer but is not perfectly flat, occlusions may be incorrect. Thus, the imperfections in representing 3D geometric primitives such as a plane by the first 3D surface representation M may cause increased errors in the interactions.

As shown in FIG. 6A for example, there is a second 3D surface representation $P_1$ of a portion of a top surface of the depiction of the table 534, wherein the second 3D surface representation $P_1$ includes a 3D geometric primitive (e.g., a plane or planar region). In this example, the plane $P_1$ is a 3D geometric primitive representing a top of the depiction of the table 534. In some implementations, the plane $P_1$ is identified using planar region recognition algorithms. In some implementations, the plane $P_1$ is identified using semantic segmentation algorithms. In some implementations, the plane $P_1$ is identified using SLAM or VIO techniques. In some implementations, the plane $P_1$ is interactively identified by a person. In some implementations, the second 3D surface representation may be continuously or repeatedly updated with additional data from a second sensor.

Figure 6B:
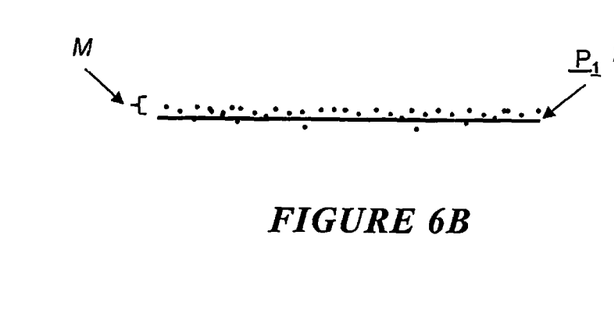
FIG. 6B is a diagram that shows a side view of a portion of a 3D reconstruction of an object.

FIG. 6B is a diagram showing a side view of a portion of 3D reconstructions of the table 434. In some implementations, the plane $P_1$ (e.g., the second 3D surface representation including a 3D geometric primitive) is less noisy than the first 3D surface representation M.

In some implementations, the first 3D surface representation M is refined based on the second 3D surface representation including the plane $P_1$.

In some implementations, all vertices (e.g., 3D locations or 3D points) in the first 3D surface representation M are analyzed to determine whether there is a nearby plane or planar region (e.g., geometric primitive). In some implementations, vertices in the first 3D surface representation M that satisfy criteria based on the plane $P_1$ are adjusted to align with (e.g., be positioned on) the plane $P_1$ (e.g., the second 3D surface representation). In some implementations, vertices in the first 3D surface representation M that satisfy criteria based on the plane $P_1$ are snapped onto (e.g., automatically positioned on) the plane $P_1$.

In some implementations, when there is a plane within a threshold 3D spatial distance (e.g., absolute distance 1 mm, 3 mm or relative distance 1%, 3%, etc.), then vertices in the first 3D surface representation M that are within the distance threshold are attached to the plane $P_1$ (e.g., at the nearest point on the plane). In some implementations, the vertices in the first 3D surface representation M that are within the distance threshold are attached to the plane $P_1$ at a point where a surface normal to that vertice intersects the plane $P_1$.

In some implementations, a comparison is made between a surface normal associated with each of the vertices in the first 3D surface representation M and a surface normal associated with the plane $P_1$ (e.g., 3D geometric primitive), and then vertices in the first 3D surface representation M that satisfy surface normal criteria or thresholds are attached to the plane $P_1$. In some implementations, an analysis based on a plurality of neighboring vertices (e.g., located on the plane $P_1$) for each vertice in the first 3D surface representation M is made, and then the vertices of the first 3D surface representation M that satisfy neighborhood criteria or thresholds is attached to the plane $P_1$.

In some implementations, vertices in the first 3D surface representation M that satisfy a combination of criteria (e.g., distance, surface normal, neighborhood, depth value confidence, etc.) based on the geometric primitive are aligned with (e.g., positioned on) the geometric primitive.

Figure 6C:
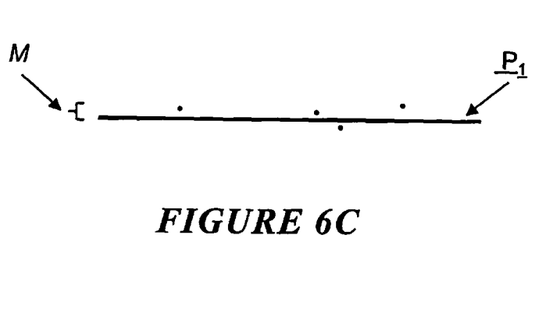
FIG. 6C is a diagram that shows a side view of a portion of a 3D reconstruction of an object.

FIG. 6C is a diagram showing a side view of a portion of 3D reconstructions of the table 434, after the first 3D surface representation (e.g., M) is aligned or refined based on the second 3D surface representation (e.g., $P_1$) in accordance with some implementations. As shown in FIG. 6C, the majority of the 3D points of the first 3D surface representation are refined and positioned on the plane $P_1$ in accordance with some implementations. More aggressive criteria for aligning (e.g., larger thresholds) the first 3D surface representation with the second 3D surface representation will increasingly "flatten" features in the first 3D surface representation in accordance with some implementations.

In some implementations, adjusting the 3D locations of the at least one point of the points of the first 3D surface representation may involve determining an intersection (e.g., line, spline, curve, point, etc.) of two geometric primitives and refining (e.g., projecting) at least one 3D point of the first 3D surface representation to a point in the intersection (e.g., the nearest point on a line of intersection of two planes).

Figure 7:
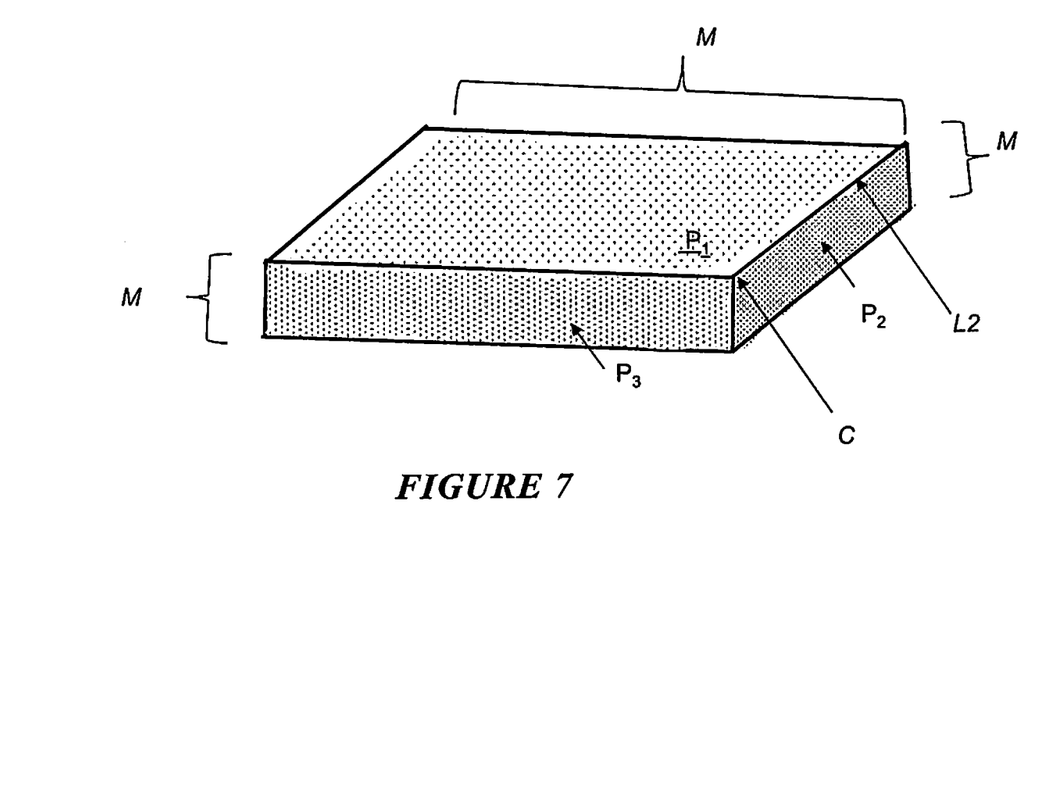
FIG. 7 is a diagram that shows a portion of a 3D reconstruction of an object.

FIG. 7 is a diagram that shows a portion of 3D reconstructions of the table 434. As shown in FIG. 7, a line L2 is determined to be the intersection between the plane $P_1$ and the plane $P_2$ in the second 3D surface representation. In some implementations, vertices in the first 3D surface representation M that satisfy criteria (e.g., distance, surface normal, neighborhood, depth value confidence, etc.) based on the geometric primitive (e.g., line L2 in the second 3D surface representation) are aligned with (e.g., positioned on) the geometric primitive.

In yet another example, adjusting the 3D locations of the at least one point of the points of the first 3D surface representation may involve determining a point at the intersection of 3 planes (e.g., three geometric primitives) and projecting the at least one point to the intersection point. As shown in FIG. 7, a corner point C is determined to be the intersection between the plane $P_1$, the plane $P_2$, and the plane P3 in the second 3D surface representation. In some implementations, vertices in the first 3D surface representation M that satisfy criteria (e.g., distance, surface normal, neighborhood, depth value confidence, etc.) based on the geometric primitive (e.g., corner point C in the second 3D surface representation) are aligned with (e.g., positioned on) the geometric primitive.

In some implementations, the first 3D surface representation (e.g., M) and the second 3D surface representation including a 3D geometric primitive (e.g., $P_1$) are in the same single 3D coordinate system. In some implementations, the first 3D surface representation and the second 3D surface representation are in the same single 3D coordinate system because a single sensor used to determine both the first 3D surface representation and the second 3D surface representation. In some implementations, the first 3D surface representation and the second 3D surface representation are in the same single 3D coordinate system based on a pose (e.g., position and orientation) of a first sensor used to determine the first 3D surface representation and a pose of a second sensor used to determine the second 3D surface representation. In some implementations, the first 3D surface representation and the second 3D surface representation are in the same single 3D coordinate system based on a first sensor used to determine the first 3D surface representation and a second sensor used to determine the second 3D surface representation are co-located on a single electronic device. In some implementations, the first 3D surface representation and the second 3D surface representation are in the same single 3D coordinate system based on a 3D spatial relationship between a first sensor used to determine the first 3D surface representation and a second sensor used to determine the second 3D surface representation that may be on different electronic devices. In some implementations, the sensor, the first sensor, or the second sensor includes one or more of an image sensor, a depth sensor, a combination of image and depth sensor, inertial sensors, a frame sensor, a DVS sensor (event camera) or the like.

Figure 8:
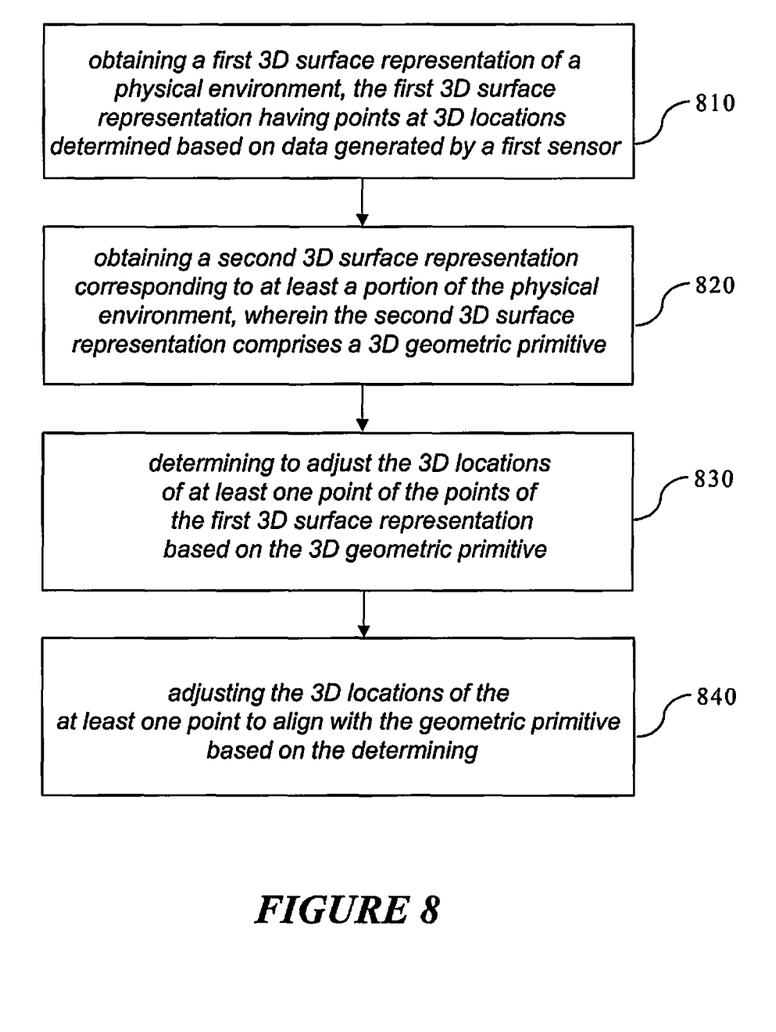
FIG. 8 is a flowchart illustrating an exemplary method for refining a first 3D surface representation of a physical environment using a second 3D surface representation that includes a 3D geometric primitive in accordance with some implementations.

FIG. 8 is a flowchart illustrating an exemplary method 800 for refining a first 3D surface representation of a physical environment using a second 3D surface representation that includes a 3D geometric primitive in accordance with some implementations. In some implementations, the first 3D surface representation of a physical environment is a 3D point cloud or a 3D mesh. In some implementations, the 3D geometric primitive is a plane, a cylinder, a cone, a sphere, a curve, or the like. In some implementations, 3D locations of points of the first 3D surface representation are adjusted based on the 3D geometric primitive. In some implementations, to provide a smoother or less noisy surface, points of the first 3D surface representation that satisfy criteria (e.g., distance, surface normal, neighborhood) are determined to correspond to a surface of the 3D geometric primitive and are adjusted (e.g., projected onto the surface of the geometric primitive). In some implementations, the method 800 is performed by a device (e.g., controller 100 or electronic device 120 of FIGS. 1-3). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains a first 3D surface representation of a physical environment, the first 3D surface representation having points at 3D locations determined based on data generated by a first sensor. In some implementations, the first 3D surface representation of the physical environment is a 3D point cloud or a 3D mesh. In some implementations, the first 3D surface representation may be determined based on depth sensor data or image sensor data (e.g., RGB image data) and thus may be imprecise or noisy.

At block 820, the method 800 obtains a second 3D surface representation corresponding to at least a portion of the physical environment, wherein the second 3D surface representation includes a 3D geometric primitive. In some implementations, the 3D geometric primitive is a plane, a cylinder, a cone, a sphere, an ovoid, a curve, or the like. In some implementations, the second 3D surface representation is less noisy than the first 3D surface representation. In some implementations, the second 3D surface representation is not based on images of the physical environment. In some implementations, the second 3D surface representation is based on 2D images from an image sensor. For example, a geometric primitive such as a plane in the second 3D surface representation is determined based on one or more 2D RGB images or 2D depth images of the physical environment, for example, using machine learning. In some implementations, the second 3D surface representation is based on 2D RGB images or 2D depth images of the physical environment, for example, using semantic segmentation. In another example, the second 3D surface representation is determined by matching the 3D geometric primitive to a portion of the first 3D surface representation.

At block 830, the method 800 determines to adjust the 3D locations of at least one point of the points of the first 3D surface representation based on the 3D geometric primitive. In some implementations, determining to adjust a 3D point of the first 3D surface representation is based on that 3D point satisfying criteria with respect to the geometric primitive. In some implementations, determining to adjust a 3D point of the first 3D surface representation is based on that 3D point being within a distance threshold, within a surface normal threshold, or within a neighborhood of 3D points of the first surface representation that satisfy a threshold with respect to a surface of the 3D geometric primitive. In some implementations, determining to adjust a 3D point of the first 3D surface representation is based on that 3D point satisfying a combination of criteria with respect to the geometric primitive.

In some implementations, determining to adjust the 3D locations of at least one point of the points of the first 3D surface representation is based on a 3D distance between the at least one point and the 3D geometric primitive. In some implementations, determining to adjust the 3D locations of at least one point of the points of the first 3D surface representation is based on a comparison between a surface normal associated with the at least one point and a surface normal associated with the 3D geometric primitive. In some implementations, determining to adjust the 3D locations of at least one point of the points of the first 3D surface representation is based on a plurality of neighboring points of the points of the first 3D surface representation being on the 3D geometric primitive.

At block 840, the method 800 adjusts the 3D locations of the at least one point of the points of the first 3D surface representation to align with (e.g., be positioned on) the geometric primitive based on the determining (e.g., the 3D point of the first 3D surface representation satisfies criteria based on the geometric primitive). In some implementations, adjusting the 3D locations of the at least one point of the points of the first 3D surface representation to align with the geometric primitive moves the at least one point to be positioned on the geometric primitive. In some implementations, adjusting the 3D locations of the at least one point of the points of the first 3D surface representation projects the at least one point to a nearest point on the geometric primitive. In some implementations, adjusting the 3D locations of the at least one point of the points of the first 3D surface representation determines an intersection between a surface normal line at the at least one point and a point on the geometric primitive.

In one example, adjusting the 3D locations of the at least one point of the points of the first 3D surface representation may involve determining a line (e.g., spline, curve) at the intersection of two planes (e.g., two geometric primitives) and projecting the at least one point to the nearest point on the line of intersection of two planes. In another example, adjusting the 3D locations of the at least one point of the points of the first 3D surface representation may involve determining a spline (e.g., curve) at the intersection of a plane and a cylinder surface (e.g., two geometric primitives) and projecting the at least one point to the nearest point on the spline at the intersection of the plane and the cylinder surface. In yet another example, adjusting the 3D locations of the at least one point of the points of the first 3D surface representation may involve determining a corner point at the intersection of 3 planes (e.g., three geometric primitives) and projecting the at least one point to the corner point.

In some implementations, the method 800 further includes rendering a virtual object interacting with the adjusted first 3D surface representation. In some implementations, the method 800 further includes rendering visual effects like re-lighting or shadows on the adjusted first 3D surface representation. In some implementations, the method 800 further includes rendering physical interactions using the adjusted first 3D surface representation. In some implementations, the adjusted first 3D surface representation includes improved interactions (e.g., simulated physics or physical interactions, occlusions or the like) or improved visual effects.

In some implementations, determining to adjust the 3D locations of the at least one point of the points of the first 3D surface representation includes rendering a plurality of tiles representing the geometric primitive into an image; and determining to adjust the 3D locations is based on comparing the 3D locations with the tiles. In some implementations, rendering a plurality of tiles representing the geometric primitive into an image is a pre-computation process that may significantly reduce the time or the computation required for determining whether the at least one point of the points of the first 3D surface representation (e.g., a 3D mesh vertice) is on one of a plurality of identified geometric primitives (e.g., a plurality of identified horizontal planes) or not. In some implementations, once the image is pre-computed, the image may be reused for all points of the first 3D surface representation (e.g., all 3D mesh vertices). In some implementations, comparisons between the tiles in the image and 3D points in the first 3D surface representation are based on a subset (e.g., one or more) of the 3D points in the first 3D surface representation. In some implementations, occupancy maps for the tiles of 3D geometric primitives may be combined (e.g., stacked).

In some implementations, machine learning is used to produce semantic information of the physical environment. In some implementations, the semantic information is used to obtain semantic segmentation of the physical environment. In some implementations, the semantic segmentation by the machine learning is able to indicate which pixels belong to corresponding 3D geometric primitives (e.g., semantics). In some implementations, the semantic segmentation is used to modify or alter 3D geometric primitives (e.g., planar regions) detected in the second 3D surface representation. In some implementations, the semantic segmentation is pre-processing that occurs before 3D geometric primitives are detected. In some implementations, the semantic segmentation is based on additional sensor data (e.g., additional sets of image or depth data, later in time) from corresponding sensors (e.g., the second sensor).

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

In some implementations, the refining of 3D representations of a physical environment is used to improve the inclusion of virtual content that is generated for an extended reality (XR) environment. In some implementations, the operating systems 230, 330 includes built in XR functionality, for example, including a XR environment application or viewer that is configured to be called to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects with virtual objects that rest upon or otherwise interact with surfaces of those real objects.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   obtaining a first three dimensional (3D) surface representation of a physical environment, the first 3D surface representation having points at 3D locations determined based on first sensor data, wherein at least a portion of the points correspond to a smooth surface in the physical environment;
   obtaining, based on second sensor data different from the first sensor data, a second 3D surface representation corresponding to at least a portion of the physical environment, wherein the second 3D surface representation comprises a 3D geometric primitive corresponding to the smooth surface in the physical environment;
   determining relative positions between the at least the portion of the points of the first 3D surface representation and the 3D geometric primitive of the second 3D surface representation; and
   refining the first 3D surface representation by repositioning at least some of the points of the first 3D surface representation to correspond to the smooth surface in the physical environment, wherein the repositioning is based on the relative positions between the at least the portion of the points of the first 3D surface representation and the 3D geometric primitive of the second 3D surface representation.

2. The method of claim 1, wherein the determining the relative positions is based on a 3D distance between the at least the portion of the points and the 3D geometric primitive.

3. The method of claim 2, wherein the determining the relative positions is further based on a comparison between a surface normal associated with the at least the portion of the points and a surface normal associated with the 3D geometric primitive.

4. The method of claim 3, wherein the determining the relative positions is further based on a plurality of neighboring points of the points of the first 3D surface representation being on the 3D geometric primitive.

5. The method of claim 1, wherein the repositioning comprises projecting at least one point to a nearest point on the 3D geometric primitive.

6. The method of claim 1, wherein the repositioning comprises:
   determining a line of intersection between two planes; and
   projecting at least one point to a nearest point on the line of intersection.

7. The method of claim 1, wherein the repositioning comprises:
   determining a spline determined by an intersection between two 3D geometric primitives; and
   projecting at least one point to a nearest point on the spline of intersection.

8. The method of claim 1, wherein the repositioning comprises:
   determining a point of intersection between three planes; and
   projecting at least one point to the point of intersection.

9. The method of claim 1, wherein the second 3D surface representation is less noisy than the first 3D surface representation.

10. The method of claim 1, wherein the first 3D surface representation is a 3D point cloud or a 3D mesh generated based on image sensor data or depth sensor data.

11. The method of claim 1, wherein the first sensor data is obtained via a first sensor of the electronic device and wherein the second sensor data is obtained via a second sensor of the electronic device different from the first sensor.

12. The method of claim 1, wherein the second 3D surface representation is determined by matching the 3D geometric primitive to a portion of the first 3D surface representation.

13. The method of claim 1, wherein the geometric primitive is a 2D plane, a cylinder, a cone, a sphere, an ovoid, a rectangle.

14. The method of claim 1, wherein the determining the relative positions comprises:
   rendering a plurality of tiles representing the geometric primitive into an image; and
   determining to adjust the 3D locations based on comparing the 3D locations with the tiles.

15. The method of claim 1, further comprising, after the repositioning, rendering a virtual object interacting with the first 3D surface representation.

16. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:

obtaining a first 3D surface representation of a physical environment, the first 3D surface representation having points at 3D locations determined based on first sensor data, wherein at least a portion of the points correspond to a smooth surface in the physical environment;

obtaining, based on second sensor data different from the first sensor data, a second 3D surface representation corresponding to at least a portion of the physical environment, wherein the second 3D surface representation comprises a 3D geometric primitive corresponding to the smooth surface in the physical environment;

determining relative positions between the at least the portion of the points of the first 3D surface representation and the 3D geometric primitive of the second 3D surface representation; and     refining the first 3D surface representation by repositioning at least some of the points of the first 3D surface representation to correspond to the smooth surface in the physical environment, wherein the repositioning is based on the relative positions between the at least the portion of the points of the first 3D surface representation and the 3D geometric primitive of the second 3D surface representation.

17. The system of claim 16, wherein the determining the relative positions is based on a 3D distance between the at least the portion of the points and the 3D geometric primitive.

18. The system of claim 17, wherein the determining the relative positions is further based on a comparison between a surface normal associated with the at least the portion of the points and a surface normal associated with the 3D geometric primitive.

19. The system of claim 18, wherein the determining the relative positions is further based on a plurality of neighboring points of the points of the first 3D surface representation being on the 3D geometric primitive.

20. A non-transitory computer-readable storage medium, storing program instructions executable on an electronic device to perform operations comprising:

obtaining a first 3D surface representation of a physical environment, the first 3D surface representation having points at 3D locations determined based on first sensor data, wherein at least a portion of the points correspond to a smooth surface in the physical environment;

obtaining, based on second sensor data different from the first sensor data, a second 3D surface representation corresponding to at least a portion of the physical environment, wherein the second 3D surface representation comprises a 3D geometric primitive corresponding to the smooth surface in the physical environment;

determining relative positions between the at least the portion of the points of the first 3D surface representation and the 3D geometric primitive of the second 3D surface representation; and     refining the first 3D surface representation by repositioning at least some of the points of the first 3D surface representation to correspond to the smooth surface in the physical environment, wherein the repositioning is based on the relative positions between the at least the portion of the points of the first 3D surface representation and the 3D geometric primitive of the second 3D surface representation.

\* \* \* \* \*